United States Patent
Irie et al.

(10) Patent No.: US 6,841,625 B2
(45) Date of Patent: Jan. 11, 2005

(54) NITRILE GROUP-CONTAINING FLUOROELASTOMER AND PREPARATION PROCESS OF SAME

(75) Inventors: Masaki Irie, Settsu (JP); Kazuyoshi Kawasaki, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 250 days.

(21) Appl. No.: 10/301,726

(22) Filed: Nov. 22, 2002

(65) Prior Publication Data

US 2003/0073786 A1 Apr. 17, 2003

Related U.S. Application Data

(62) Division of application No. 09/937,901, filed as application No. PCT/JP00/01913 on Mar. 28, 2000, now Pat. No. 6,518,366.

(30) Foreign Application Priority Data

Mar. 31, 1999 (JP) ............................................. 11-93676

(51) Int. Cl.⁷ .................................................. C08F 8/18
(52) U.S. Cl. .............................. 525/326.2; 525/326.4; 525/359.3; 525/378; 525/379
(58) Field of Search .............................. 525/359.3, 378, 525/379

(56) References Cited

U.S. PATENT DOCUMENTS

| | | | |
|---|---|---|---|
| 4,599,386 A | 7/1986 | Carlson et al. |
| 5,019,630 A | 5/1991 | Chida et al. |
| 5,115,038 A | 5/1992 | Ihara et al. |
| 5,547,911 A | 8/1996 | Grot |

FOREIGN PATENT DOCUMENTS

JP       1-115933        5/1989

OTHER PUBLICATIONS

International Search Report for PCT/JP00/01913 dated Jul. 4, 2000.

International Preliminary Examination Report for PCT/JP00/01913 dated Jun. 6, 2001.

*Primary Examiner*—Bernard Lipman
(74) *Attorney, Agent, or Firm*—Sughrue Mion, PLLC

(57) ABSTRACT

To provide a solid fluoroelastomer having nitrile group at the, end which gives a crosslinked product being excellent in heat resistance, solvent resistance, chemical resistance, compression set and cleanliness, and an economical process for preparation thereof. The process for preparing a nitrile group-containing fluoroelastomer by converting amide group contained in a polymer molecular chain of a solid fluoroelastomer into nitrile group in the presence of a dehydrating agent.

2 Claims, No Drawings

NITRILE GROUP-CONTAINING FLUOROELASTOMER AND PREPARATION PROCESS OF SAME

This is a divisional of application Ser. No. 09/937,901 filed Oct. 1, 2001 now U.S. Pat. No. 6,518,366, which is a 371 of PCT/JP00/01913 filed Mar. 28, 2000; the above noted prior applications are all hereby incorporated by reference.

TECHNICAL FIELD

The present invention relates to a nitrile group-containing fluoroelastomer having nitrile group in a molecular chain, particularly at the end of the molecular chain and a process for preparation thereof. The elastomer can give a crosslinked product having a very good sealing property, mechanical strength and ultra high heat resistance of not less than 300° C.

BACKGROUND ART

Fluoroelastomers comprising a fluoromonomer unit as a recurring unit such as tetrafluoroethylene (TFE) are used widely as a sealing material to be used under strict environment since they exhibit excellent chemical resistance, solvent resistance and heat resistance. Particularly in the fields of aviation and space industries, semi-conductor production apparatuses and chemical plants, which are major applications of the fluoroelastomers, heat resistance of sealing at 300° C. or more is demanded.

Such a crosslinked product having excellent heat resistance is obtained by firstly preparing a nitrile group-containing fluoroelastomer having nitrile group in a molecular chain as a cure site by copolymerizing perfluoro(vinyl ether) (CNVE) having nitrile group with TFE and perfluoro (alkyl vinyl ether) (PAVE) and then crosslinking the fluoroelastomer by triazine crosslinking with organotin, oxazole crosslinking with a bisaminophenol compound or tetraamine compound or imidazole crosslinking, as described, for example, in JP-A-58-152041 and JP-A-59-109546.

However CNVE for introducing nitrile group as a cure site requires a long synthesis step and is very expensive, and also the nitrile group in the obtained nitrile group-containing fluoroelastomer is unstable. Further a mechanical strength and sealing property at high temperature (compression set) of the obtained crosslinked product are insufficient.

The inventors of the present invention have made various studies with respect to conventional nitrile group-containing fluoroelastomers and assumed that a reason why sufficient properties were not obtained was the fact that nitrile cure site group is present only as a pendant of a molecular chain. Thus the inventors have studied introduction of nitrile group into an end of the molecular chain. However in a conventional method described in Polymer Journal, Vol. 17, No. 1, pp 253 to 263, in which a solid dehydrating agent such as phosphorus pentoxide is used (Formula 10 at page 261), it is possible to carry out conversion of an end group of liquid fluorooil into nitrile group but a solid fluoroelastomer cannot be dehydrated uniformly and the dehydrating agent remains in the obtained product. Therefore an intended solid fluoroelastomer having nitrile group at the end could not be obtained.

An object of the present invention is to provide a solid fluoroelastomer having, at the end, nitrile group functioning as a cure site, and an economical preparation process thereof.

Another object of the present invention is to provide a novel synthesis process for converting amide group into nitrile group, and a dehydrating agent to be used therefor.

DISCLOSURE OF INVENTION

The present invention relates to a process for preparing a nitrile group-containing fluoroelastomer by converting amide group contained in a polymer molecular chain of a solid fluoroelastomer into nitrile group in the presence of a dehydrating agent.

It is preferable that the dehydrating agent to be used is in the form of gas or liquid. Particularly $COF_2$ is preferable.

The solid nitrile group-containing fluoroelastomer to be prepared in the present invention, which has nitrile groups at both ends and is represented by the formula (I):

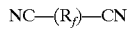

wherein $R_f$ is a divalent fluoroelastomer chain, is a novel fluoroelastomer.

It is preferable that the fluoroelastomer chain $R_f$ is a perfluoroelastomer chain of copolymer or terpolymer represented by the formula (1):

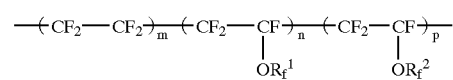

wherein $m/(n+p)$ is 95 to 50/5 to 50, $n/p$ is 0/100 to 100/0, $m+n+p$ is from 100 to 10,000, $R_f^1$ is a perfluoroalkyl group having 1 to 8 carbon atoms, $R_f^2$ is $-(CF_2CFYO)_qR_f^3$, in which $R_f^3$ is a perfluoroalkyl group having 1 to 6 carbon atoms, Y is fluorine atom or a trifluoromethyl group, q is an integer of 1 to 5, or a perfluoroelastomer chain of terpolymer or tetrapolymer represented by the formula (2):

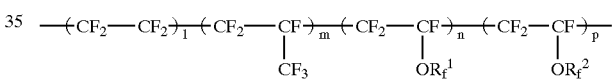

wherein $1/m/(n+p)$ is 95 to 35/0 to 30/5 to 35, $n/p$ is 0/100 to 100/0, $1+m+n+p$ is from 100 to 10,000, $R_f^1$ and $R_f^2$ are as defined above.

The fluoroelastomer composition particularly comprising a solid nitrile group-containing fluoroelastomer having nitrile groups at ends in the number of more than ½ of a total number of end groups of molecular chains of the fluoroelastomer provides a crosslinked product having excellent properties.

Further the present invention relates to the process for preparing an amide group-containing fluoroelastomer which is a starting substance for the above-mentioned reaction for converting into nitrile group, by reacting a solid fluoroelastomer having ester group in a molecular chain thereof, particularly at the end of the molecular chain with ammonia or aqueous ammonia.

Further the present invention relates to a solid amide group-containing fluoroelastomer having amide groups at both ends and represented by the formula (II):

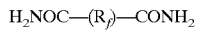

wherein $R_f$ is a divalent fluoroelastomer chain.

Also the present invention relates to a novel process for synthesis of a nitrile compound which is represented by the formula (IV):

wherein R is a monovalent organic group, and is prepared by dehydrating an amide compound represented by the formula (III):

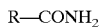

wherein R is as defined above, in the presence of $COF_2$. It is advantageous to use $COF_2$ as the dehydrating agent for such a reaction for converting into nitrile group, from the viewpoint of yield, low boiling point and easy removal of un-reacted gas after the reaction.

BEST MODE FOR CARRYING OUT THE INVENTION

Firstly the present invention relates to the process for preparing a nitrile group-containing fluoroelastomer by converting amide group contained in a polymer molecular chain of a solid fluoroelastomer into nitrile group in the presence of a dehydrating agent.

A fluoropolymer which is a starting material in the process for preparing the nitrile group-containing fluoroelastomer of the present invention is firstly (1) in the form of solid. This means that a liquid fluorooil which is described in the above-mentioned Polymer Journal, has a relatively low molecular weight (10,000 or less) and comprises essentially a fluoroether unit, is excluded. As mentioned above, in case of a liquid fluoropolymer, conventional dehydrating agents can be used, but in case of a solid fluoropolymer, non-uniform reaction arises and a desired object cannot be obtained.

Secondly (2) the fluoropolymer has amide group in a molecular chain thereof. The amide group may be present in the molecular chain as a pendant or may be present as end group of the molecular chain. It is a matter of course that the amide groups may be present in the both forms. The present invention has an important meaning that it becomes possible to introduce nitrile group as end group, which has been so far impossible. Particularly the solid fluoroelastomer having nitrile groups at both ends, which can be prepared by the process of the present invention and is represented by the above-mentioned formula (I) is a novel fluoroelastomer.

In the present invention, an elastomer chain ($R_f$ in the formula (I)) on a trunk chain portion of the fluoroelastomer does not change substantially. Examples of the fluoroelastomer chain $R_f$ are, for instance, a perfluoroelastomer chain of copolymer or terpolymer represented by the formula (1):

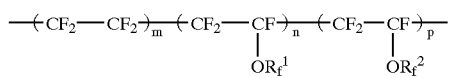

wherein m/(n+p) is 95 to 50/5 to 50, n/p is 0/100 to 100/0, m+n+p is from 100 to 10,000, $R_f^1$ is a perfluoroalkyl group having 1 to 8 carbon atoms, $R_f^2$ is $—(CF_2CFYO)_q R_f^3$, in which $R_f^3$ is a perfluoroalkyl group having 1 to 6 carbon atoms, Y is fluorine atom or a trifluoromethyl group, q is an integer of 1 to 5, a perfluoroelastomer chain of terpolymer or tetrapolymer represented by the formula (2):

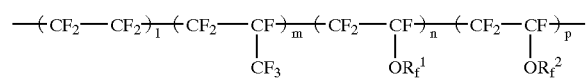

wherein 1/m/(n+p) is 95 to 35/0 to 30/5 to 35, n/p is 0/100 to 100/0 l+m+n+p is from 100 to 10,000, $R_f^1$ and $R_f^2$ are as defined above, a non-perfluoroelastomer chain such as a fluoroelastomer chain of copolymer represented by the formula (3):

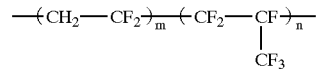

wherein m/n is 85 to 60/15 to 40, m+n is from 100 to 10,000, a fluoroelastomer chain of terpolymer represented by the formula (4):

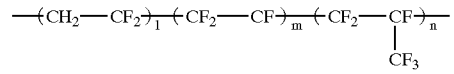

wherein l/m/n is 85 to 20/0 to 40/15 to 40, l+m+n is from 100 to 10,000, a fluoroelastomer chain of terpolymer or tetrapolymer represented by the formula (5):

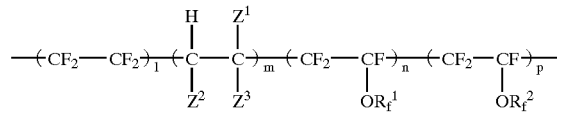

wherein l/m/(n+p) is 95 to 45/0 to 10/5 to 45, n/p is 0/100 to 100/0, l+m+n+p is from 100 to 10,000, $R_f^1$ and $R_f^2$ are as defined above, $Z^1$, $Z^2$ and $Z^3$ are fluorine atom or hydrogen atom individually, or a fluoroelastomer chain of terpolymer or tetrapolymer represented by:

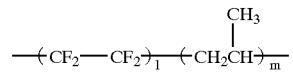

wherein l/m=20/80 to 80/20, l+m=100 to 10,000,

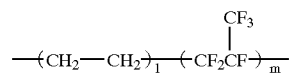

wherein l/m=80/20 to 50/50, l+m=100 to 10,000, or

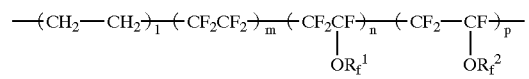

wherein l/m/(n+p) is 85 to 5/5 to 85/10 to 40, n/p is 0/100 to 100/0, l+m+n+p is from 100 to 10,000, $R_f^1$ and $R_f^2$ are as defined above, and the like.

With respect to the non-perfluoroelastomer chain, conversion into nitrile group may be carried out after fluorination of the non-perfluoroelastomer chain with a fluorine gas or the like.

The end group of those fluoroelastomer chains $R_f$ and/or amide group being present as a pendant are converted to nitrile group in the presence of a dehydrating agent.

It is preferable that the dehydrating agent is in the form of gas or liquid because the elastomer is in the form of solid. Examples of the dehydrating agent in the form of gas are, for instance, $COF_2$, $COCl_2$, $SO_3$, and the like. Particularly $COF_2$ is preferable from the viewpoint of good yield, relatively moderate reaction conditions and easy treatment.

Use of $COF_2$ as a dehydrating agent for converting amide group into nitrile group, i.e. nitrilation of amide group has novelty.

Examples of the dehydrating agent in the form of liquid are, for instance, acetic anhydride, trifluoroacetic anhydride, $ClCO_2C_2H_5$, and the like. Particularly trifluoroacetic anhydride is preferable from the viewpoint of a yield. As case demands, an acid acceptor such as pyridine, triethylamine, or the like may be used together with those dehydrating agents.

The reaction for converting amide group into nitrile group advances at a temperature of −20° C. to 200° C. It is preferable to carry out the reaction under heating, particularly at a temperature of 50° C. to 150° C. from the viewpoint of a good yield and a short reaction time. The reaction pressure is from atmospheric pressure to 5 MPaG, preferably 1 to 2 MPaG. The reaction time is usually from about 10 hours to about 90 hours. The reaction can be carried out in the presence or absence of a solvent. When the solvent is used, for example, a fluorine-containing solvent (for example, FLORINATE (registered trademark) series available from SUMITOMO 3M LIMITED), and the like can be used.

Further the present invention relates to the process for preparing the amide group-containing fluoroelastomer which is a starting material for preparing the nitrile group-containing fluoroelastomer.

The solid fluoroelastomer is usually prepared by radical polymerization of a fluorine-containing monomer by using a radical polymerization initiator. There are various compounds known as a radical polymerization initiator. A lot of general-purpose initiators, for example, ammonium persulfate, potassium persulfate, and the like are converted to carboxyl groups by acid treatment to be carried out when collecting a produced elastomer, thereby giving a fluoroelastomer having carboxyl groups at ends. A usual method which can be considered for converting the end carboxyl groups into amide groups suitable for nitrilation of the present invention is a method of firstly forming the carboxyl group into an ammonium salt with ammonia and then heating for dehydration. However when this method was carried out actually, it was found that ammonia was evaporated by heating the ammonium salt and the ammonium salt reverted to carboxyl group. As a result, the inventors of the present invention have found that even in case of a solid carboxyl group-containing fluoroelastomer, the carboxyl group can be converted into amide group effectively by once carrying out esterification of the carboxyl group and then reacting it with ammonia or aqueous ammonia in the same manner as in the liquid fluorooil described in the above-mentioned Polymer Journal. The obtained solid amide group-containing fluoroelastomer is also a novel elastomer.

Namely the present invention relates to the method of converting ester group into amide group by reacting a solid fluoroelastomer having ester group in a molecular chain, particularly at the end of the molecular chain with ammonia or aqueous ammonia.

The reaction conditions which can be used are mentioned below.

(1) Reaction temperature:
   −20° C. to 200° C., preferably ordinary temperature to 100° C.
(2) Reaction pressure:
   Normal pressure to 2 MPaG, preferably 0.1 to 0.5 MPaG The esterification of the carboxyl group-containing fluoroelastomer can be carried out under usual esterification conditions, for example, by a method of reacting the elastomer with an alcohol in the presence of an acid catalyst, a method of converting into an acid chloride with thionyl chloride and then reacting with an alcohol, or the like method.

Examples of the alcohol to be used for the esterification are, for instance, methanol, ethanol, 1-propanol, 2-propanol, and the like. Particularly methanol is preferable from the viewpoint of excellent yield and economy.

As mentioned above, it is known that nitrile group is introduced as a pendant of a fluoroelastomer. However a nitrile group-containing fluoromonomer to be used for the introduction of nitrile group is very expensive, and as a result, the obtained nitrile group-containing fluoropolymer is expensive.

According to the preparation process of the present invention, nitrile group can be introduced as a pendant by copolymerizing an inexpensive carboxyl group-containing fluoromonomer to introduce carboxyl group as a pendant, and after carrying out esterification of the carboxyl group as mentioned above to form into amide group, converting into nitrile group.

Examples of the carboxyl group-containing fluoromonomer to introduce nitrile group as a pendant are, for instance,

(n=1 to 2, m=1 to 4),
(n=1 to 5),
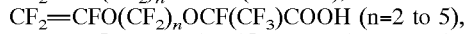(n=2 to 5),
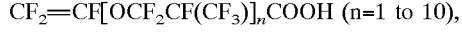(n=1 to 10),

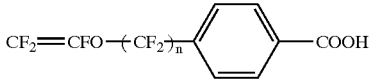

(n = 1 to 6), $CH_2=CH(CF_2)_nCOOH$ (n=1 to 10), and the like.

From the viewpoint of good copolymerizability and crosslinkability, particularly $CF_2=CFOCF_2CF(CF_3)OCF_2CF_2COOH$ is preferable.

Also the perfluoroelastomer can be prepared from the non-perfluoroelastomer by fluorinating the non-perfluoromonomer with a fluorine gas, or the like and then carrying out the nitrilation because if the non-perfluoromonomer is fluorinated after the nitrilation, nitrile group is fluorinated.

As mentioned above, the method of converting amide group into nitrile group in the presence of $COF_2$ which is a dehydrating agent is a novel method. This reaction is not a reaction inherent to the amide group-containing fluoroelastomer and can be applied to the nitrilation reaction of general amide compounds including low molecular weight compounds.

Therefore the present invention further relates to the process for synthesis of the nitrile compound represented by the formula (IV):

wherein R is a monovalent organic group, by dehydrating the amide compound represented by the formula (III):

wherein R is as defined above, in the presence of $COF_2$.

Examples of the monovalent organic group represented by R are various organic groups such as fluoroelastomer chains having a residue of polymerization initiator or chain transfer agent or a group derived therefrom at one end thereof, a linear or branched hydrocarbon group which has 1 to 20 carbon atoms and may be substituted by one or more halogen atoms, $CF_3CONH_2$, $CH_3CONH_2$, $C_2F_5CONH_2$, $C_2H_5CONH_2$, $C_6H_{11}CONH_2$, $C_6H_5CONH_2$ and $C_7H_{15}CONH_2$. Also the process can be applied to a liquid fluorooil mainly comprising a fluoroether unit which is described in the above-mentioned Polymer Journal.

The reaction conditions for the synthesis may be the same as in the above-mentioned nitrilation reaction of the solid fluoroelastomer.

In the present invention, a principal object of introducing nitrile group is, as mentioned above, to use the nitrile group as a cure site of the solid fluoroelastomer. Particularly by introducing nitrile group into at least one end group, preferably into the both end groups, mechanical properties, heat resistance and compression set of a crosslinked product can be enhanced.

In the present invention, it is ideal to carry out the nitrilation perfectly. However in order to enhance characteristics of the elastomer, the number of nitrile groups may be more than ½ of the total number of end groups of the obtained fluoroelastomer, preferably 70% or more, particularly preferably 90% or more. Namely the fluoroelastomer may contain at least one fluoroelastomer chain having nitrile groups at its both ends. It is preferable that the remaining cure sites may be carboxyl group, ester group or amide group.

The present invention further, relates to the fluoroelastomer composition comprising the above-mentioned nitrile group-containing fluoroelastomer. It is preferable that a crosslinking agent is contained in the composition.

The nitrile group-containing fluoroelastomer of the present invention can be crosslinked by triazine crosslinking, oxazole crosslinking, thiazole crosslinking, imidazole crosslinking, and the like. Particularly oxazole crosslinking is preferable from the viewpoint of good compression set, heat resistance and economy.

Examples of the crosslinking agent which can be used are organotin compounds such as tetraphenyltin and triphenyltin hydride for the triazine crosslinking; bisaminophenols such as bisaminophenol AF for the oxazole crosslinking; bisaminothiophenols such as bisaminothiophenol for the thiazole crosslinking; tetraamines such as bis(1,2-phenylenediamine) and 2,2-bis(3,4-diaminophenyl)hexafluoropropane for the imidazole crosslinking; and the like.

Crosslinked products obtained from the fluoroelastomer of the present invention are excellent in heat resistance, chemical resistance, physical properties in normal state, compression set, plasma resistance, cleanliness, and the like, and can exhibit very excellent characteristics as various materials for sealing members, gaskets, hoses and rolls.

The present invention is then explained by means of examples, but is not limited thereto.

EXAMPLE 1

(1) Synthesis of Polymer Having End Carboxyl Group

A 6,000-ml stainless steel autoclave having no ignition source was charged with 2,340 ml of pure water, 23.4 g of:

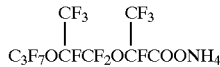

as an emulsifying agent and 0.21 g of disodium hydrogen phosphate $12H_2O$ as a pH control agent, and after replacing the inside of the system with nitrogen gas sufficiently for deaeration, the autoclave was heated up to 50° C. with stirring at 600 rpm. Then perfluoro(methyl vinyl ether) (PMVE) was introduced so that the inside pressure became 0.3 MPaG (3.0 kgf/cm²G) in a gauge pressure and further tetrafluoroethylene (TFE) was introduced until the inside pressure became 0.4 MPaG (4.1 kgf/cm²G). Then 12.3 g of ammonium persulfate (APS) dissolved in 30 ml of water was introduced with a pressurized nitrogen gas to initiate a reaction.

When the inside pressure was lowered to 0.34 MPaG (3.5 kgf/cm²G) with advance of the polymerization, 6.2 g of PMVE and 5.6 g of TFE were introduced with the respective self pressures to recover 0.4 MPaG (4.1 kgf/cm²G). After that, lowering of the pressure to 0.34 MPaG (3.5 kgf/cm²G) and introduction of PMVE and TFE for recovering the pressure were repeated.

At the time when a total amount of TFE and PMVE reached 210 g seven hours after starting of the polymerization, the autoclave was cooled and un-reacted monomer was released to give 2,558 g of an aqueous dispersion having a solid content of 8.0% by weight.

1,800 Grams of the obtained aqueous dispersion was diluted with 5,400 g of water and slowly added to 4,800 g of an aqueous solution of 3.5% by weight of hydrochloric acid with stirring. After the addition, stirring was continued for five minutes, and a precipitated product was filtrated off. The obtained polymer was further added to 2 kg of HCFC-141b, followed by stirring for five minutes and filtrating off again. After that, the steps of washing with HCFC-141b and filtrating off were repeated four times, followed by vacuum drying at 120° C. for 48 hours to give 140 g of polymer.

As a result of ¹⁹F-NMR analysis, contents of TFE and PMVE in the polymer were 58.6% by mole and 41.4% by mole, respectively.

(2) Esterification of Polymer Having End Carboxyl Group

A 500-ml four-necked flask equipped with a stirrer, thermometer and reflux tube was charged with 130 g of the polymer prepared in (1) above, 200 ml of methanol and 2 ml of sulfuric acid, and after 15-hour refluxing, was cooled to room temperature. After filtration of the reaction solution, 30 ml of methanol was added and washing by shaking was carried out for 10 minutes. After the washing by shaking with methanol three times, vacuum drying was carried out at 100° C. for 3 hours to give 130 g of a polymer having, at the end, ester group obtained by methyl-esterification of carboxyl group. A conversion of the esterification to the polymer having ester group at the end was 95.6% which was calculated from IR absorbance ratio of carbonyl group (1,769 cm⁻¹) in carboxyl group before and after the reaction.

(3) Amidation of Polymer Having End Ester Group

After a 200-ml stainless steel autoclave was charged with 130 g of the polymer having, at the end, ester group which was prepared in (2) above, the inside pressure of the autoclave was increased up to 0.3 MPa·G at 60° C. with ammonia gas. After the reaction was continued in that state for three hours, a remaining gas was exhausted, followed by vacuum drying at 150° C. for three hours to give 130 g of a polymer having amide group at the end. A conversion of the amidation to the polymer having amide group at the end was 99.2% which was calculated from IR absorbance ratio of carbonyl group (1,798 cm⁻¹) in ester group before and after the reaction.

(4) Nitrilation of the Polymer Having End Amide Group

After a 200-ml stainless steel autoclave was charged with 130 g of the polymer having, at the end, amide group which was prepared in (3) above, the inside pressure of the autoclave was increased up to 1.0 MPa·G at 100° C. with $COF_2$. After the reaction was continued in that state for 70 hours, a remaining gas was exhausted, followed by vacuum drying at ordinary temperature for 20 hours and then vacuum drying at 80° C. for 26 hours to give 130 g of a polymer. According to IR analysis of the obtained polymer, an absorption of nitrile group was recognized at 2,265 cm⁻¹. A conversion of the nitrilation of the polymer was 84.0% which was calculated from IR absorbance ratio of carbonyl group (1,752 cm⁻¹) in amide group before and after the reaction.

EXAMPLE 2

(1) Synthesis of Polymer Having Carboxyl Group at an End and Side Chain

A 3,000-ml stainless steel autoclave having no ignition source was charged with 1,000 ml of pure water, 10 g of:

as an emulsifying agent and 0.09 g of disodium hydrogen phosphate $12H_2O$ as a pH control agent, and after replacing the inside of the system with nitrogen gas sufficiently for deaeration, the autoclave was heated up to 50° C. with stirring at 600 rpm. Then a gas mixture of tetrafluoroethylene (TFE) and perfluoro(methyl vinyl ether) (PMVE) (TFE/PMVE=25/75 in mole ratio) was introduced so that the inside pressure became 0.8 MPaG (8.0 kgf/cm$^2$G). Then 10 ml of an aqueous solution of ammonium persulfate (APS) having a concentration of 527 mg/ml was introduced with a pressurized nitrogen gas to initiate a reaction.

When the inside pressure was lowered to 0.7 MPaG (7.0 kgf/cm$^2$G) with advance of the polymerization, 3.78 g of $CF_2$=$CFOCF_2CF(CF_3)OCF_2CF_2COOH$ (CBVE) was introduced with a pressurized nitrogen gas. Then 4.7 g of TFE and 5.3 g of PMVE were introduced with the respective self pressures so that the inside pressure became 0.8 MPaG (8.0 kgf/cm$^2$G). After that, with advance of the reaction, TFE and PMVE were introduced under pressure in the same manner, and increasing and lowering of the inside pressure were repeated between 0.7 MPaG (7 kgf/cm$^2$G) and 0.8 MPaG (8 kgf/cm$^2$G). At the time when a total amount of TFE and PMVE reached 80 g 4.2 hours after starting of the polymerization, the autoclave was cooled and un-reacted monomer was released to give 1,091 g of an aqueous dispersion having a solid content of 7.5% by weight.

1,000 Grams of the obtained aqueous dispersion was diluted with 3,000 g of water, followed by slowly adding to 2,800 g of an aqueous solution of 3.5% by weight of hydrochloric acid with stirring. After the addition, stirring was continued for five minutes, and a precipitated product was filtrated off. The obtained polymer was further added to 800 g of HCFC-141b, followed by stirring for five minutes and filtrating off again. After that, the steps of washing with HCFC-141b and filtrating off were repeated four times, followed by vacuum drying at 120° C. for 72 hours to give 72 g of a polymer having carboxyl group at the end and side chain.

As a result of $^{19}$F-NMR analysis, monomer units of the polymer were TFE/PMVE/CBVE=57.3/41.8/0.9 in % by mole.

According to infrared spectroscopic analysis, a characteristic absorption of carboxyl group was recognized around 1,774.9 cm$^{-1}$ and a characteristic absorption of OH group was recognized around 3,557.0 cm$^{-1}$ and around 3,087.7 cm$^{-1}$.

(2) Esterification of Polymer Having Carboxyl Group at an End and Side Chain

A 500-ml four-necked flask equipped with a stirrer, thermometer and reflux tube was charged with 130 g of the polymer prepared in (1) above, 200 ml of methanol and 2 ml of sulfuric acid, and after 15-hour refluxing, was cooled to room temperature. After filtration of the reaction solution, 30 ml of methanol was added and washing by shaking was carried out for 10 minutes. After the washing by shaking with methanol three times, vacuum drying was carried out at 100° C. for 3 hours to give 130 g of a polymer having, at the end and side chain, ester group obtained by methylesterification of caboxyl group. A conversion of the esterification to the polymer having ester group at the end and side chain was 95.8% which was calculated from IR absorbance ratio of carbonyl group in carboxyl group before and after the reaction.

(3) Amidation of Polymer Having Ester Group at an End and Side Chain

After a 200-ml stainless steel autoclave was charged with 130 g of the polymer having ester group at the end and side chain and prepared in (2) above, the inside pressure of the autoclave was increased up to 0.3 MPa·G at 60° C. with ammonia gas. After the reaction was continued in that state for three hours, a remaining gas was exhausted, followed by vacuum drying at 150° C. for three hours to give 130 g of a polymer having amide group at the end and side chain. A conversion of the amidation to the polymer having amide group at the end and side chain was 99.4% which was calculated from IR absorbance ratio of carbonyl group in the ester group before and after the reaction.

(4) Nitrilation of Polymer Having Amide Group at an End and Side Chain

After a 200-ml stainless steel autoclave was charged with 130 g of the polymer having amide group at the end and side chain and prepared in (3) above, the inside pressure of the autoclave was increased up to 1.0 MPa·G at 100° C. with $COF_2$. After the reaction was continued in that state for 70 hours, a remaining gas was exhausted, followed by vacuum drying at ordinary temperature for 20 hours and then vacuum drying at 80° C. for 26 hours to give 130 g of a polymer having nitrile group at the end and side chain. A conversion of the nitrilation of the polymer having nitrile group at the end and side chain was 83.4% which was calculated from IR absorbance ratio of carbonyl group in the amide group before and after the reaction.

EXAMPLE 3

A dried 25-ml stainless steel bomb was charged with 0.83 g of perfluorooctanoic acid amide (available from PCR Inc.) and 1 ml of diethylene glycol dimethyl ether, and after pressure reduction to 5 mmHg, the bomb was sealed. Subsequently the inside pressure of the bomb was increased to 1.0 MPaG with $COF_2$ and the reaction was continued at room temperature. 24 Hours after, a remaining gas was exhausted and a reaction mixture was neutralized with 10% aqueous solution of $NaHCO_3$ to a neutral level to separate into two phases. From the lower phase, 0.71 g of yellow oily substance was obtained. According to gas chromatography and GC mass spectrum analysis (column: SE-30), production of $C_7F_{15}CN$ was recognized. A purity of the crude product was 89:5% and a yield of the reaction was 80.1%.

INDUSTRIAL APPLICABILITY

According to the present invention, a solid fluoroelastomer having, at the end, nitrile group functioning as a cure site and an economical preparation process thereof can be provided. Crosslinked products obtained from such a fluoroelastomer are excellent particularly in heat resistance, solvent resistance, chemical resistance, compression set, cleanliness, and the like, and can exhibit very excellent characteristics as various materials for sealing members, gaskets, hoses and rolls in the fields of semi-conductor production apparatuses, transportation means such as car, aircraft, rocket and vessel, chemical industries such as chemical plant and medical instruments and machinery such as developing machine, printing machine and coating facilities.

What is claimed is:

1. A process for preparing a nitrile compound which comprises, dehydrating an amide compound in the presence of $COF_2$.

2. The process of claim 1, wherein the nitrile compound is represented by the formula (IV):

$$R\text{—}CN$$

wherein R is a monovalent organic group, and the amide compound is represented by the formula (III):

$$R\text{—}CONH_2$$

wherein R is as defined above.

* * * * *